United States Patent
Selvarajan et al.

(10) Patent No.: US 11,048,425 B2
(45) Date of Patent: Jun. 29, 2021

(54) DATA INTEGRITY VERIFICATION

(71) Applicant: HEWLETT PACKARD ENTERPRISE DEVELOPMENT LP, Houston, TX (US)

(72) Inventors: Naveen Kumar Selvarajan, Bangalore (IN); Sijesh T. Balakrishnan, Bangalore (IN); Arun Krishna Pillai, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/557,400

(22) Filed: Aug. 30, 2019

(65) Prior Publication Data
US 2021/0064238 A1 Mar. 4, 2021

(51) Int. Cl.
*G06F 3/06* (2006.01)
*H04L 9/06* (2006.01)
*G06F 11/14* (2006.01)

(52) U.S. Cl.
CPC ............ *G06F 3/064* (2013.01); *G06F 3/0608* (2013.01); *G06F 3/0679* (2013.01); *G06F 11/1464* (2013.01); *H04L 9/0643* (2013.01)

(58) Field of Classification Search
CPC .... G06F 3/0679; G06F 3/064; G06F 11/1464; G06F 3/0608; H04L 9/0643
USPC ....................................................... 711/103
See application file for complete search history.

(56) References Cited

U.S. PATENT DOCUMENTS

| | | |
|---|---|---|
| 5,403,639 A | 4/1995 | Belsan et al. |
| 6,928,607 B2 | 8/2005 | Loaiza et al. |
| 7,568,080 B2 | 7/2009 | Prahlad et al. |
| 2011/0161299 A1 | 6/2011 | Prahlad et al. |
| 2015/0212897 A1* | 7/2015 | Kottomtharayil ....... G06F 11/00 714/20 |
| 2018/0188967 A1* | 7/2018 | Belmanu Sadananda ................... G06F 11/1469 |

OTHER PUBLICATIONS

Netapp, Inc., "SnapManager® 7.1.1 for Microsoft® Exchange Server," Sep. 2015, 40 pages. <https://library.netapp.com/ecm/ecm_download_file/ECMP12477869>.

(Continued)

*Primary Examiner* — Hua J Song
(74) *Attorney, Agent, or Firm* — Hewlett Packard Enterprise Patent Department

(57) ABSTRACT

In some examples, data integrity verification may include obtaining, from an application for which data is stored in a primary storage volume, an identification of data blocks of the primary storage volume that are stored for the application in a snapshot storage volume that represents a snapshot of data stored in the primary storage volume. The identification may include references to locations of the data blocks in the primary storage volume. Using physical extent mappings and volume block addressing, the identified locations of the data blocks in the primary storage volume may be translated to locations of snapshot storage volume blocks of the snapshot storage volume. Based on the snapshot storage volume blocks that are read from the snapshot storage volume, integrity of corresponding backup copy blocks stored in a backup copy for backup of the primary storage volume may be verified.

20 Claims, 7 Drawing Sheets

(56) References Cited

OTHER PUBLICATIONS

Unknown, "Fiemap IOCtl", retrieved from Internet on Aug. 28, 2019, 4 pages. <https://www.kernel.org/doc/Documentation/filesystems/fiemap.txt>.

Unknown, "HPE Recovery Manager Central", retrieved from Internet on Aug. 28, 2019, 20 pages. <https://www.hpe.com/in/en/storage/rmc-backup.html>.

\* cited by examiner

600

```
┌─────────────────────────────────────────────────────────┐
│ OBTAIN, FOR AN APPLICATION FOR WHICH DATA IS STORED IN A │
│ PRIMARY STORAGE VOLUME, AN IDENTIFICATION OF DATA BLOCKS OF │
│ THE PRIMARY STORAGE VOLUME THAT ARE STORED FOR THE      │
│ APPLICATION IN A SNAPSHOT STORAGE VOLUME THAT REPRESENTS A │
│ SNAPSHOT OF DATA STORED IN THE PRIMARY STORAGE VOLUME   │
│                          602                             │
└─────────────────────────────────────────────────────────┘
                           │
                           ▼
┌─────────────────────────────────────────────────────────┐
│ USING PHYSICAL EXTENT MAPPINGS AND VOLUME BLOCK         │
│ ADDRESSING, TRANSLATING THE IDENTIFIED LOCATIONS OF THE │
│ DATA BLOCKS IN THE PRIMARY STORAGE VOLUME TO LOCATIONS OF │
│ SNAPSHOT STORAGE VOLUME BLOCKS OF THE SNAPSHOT STORAGE  │
│                        VOLUME                            │
│                          604                             │
└─────────────────────────────────────────────────────────┘
                           │
                           ▼
┌─────────────────────────────────────────────────────────┐
│   READ, FROM THE SNAPSHOT STORAGE VOLUME, THE SNAPSHOT  │
│                 STORAGE VOLUME BLOCKS                    │
│                          606                             │
└─────────────────────────────────────────────────────────┘
                           │
                           ▼
┌─────────────────────────────────────────────────────────┐
│ VERIFY, BASED ON THE SNAPSHOT STORAGE VOLUME BLOCKS THAT │
│ ARE READ FROM THE SNAPSHOT STORAGE VOLUME, INTEGRITY OF │
│ CORRESPONDING BACKUP COPY BLOCKS STORED IN A BACKUP COPY │
│      FOR BACKUP OF THE PRIMARY STORAGE VOLUME           │
│                          608                             │
└─────────────────────────────────────────────────────────┘
```

*FIG. 6*

DATA INTEGRITY VERIFICATION

BACKGROUND

Data may be stored using a variety of techniques, and on a variety of storage devices. In some cases, multiple copies of data may be stored, for example, for purposes such as system recovery, distribution of data copies, etc.

BRIEF DESCRIPTION OF DRAWINGS

Features of the present disclosure are illustrated by way of example and not limited in the following figure(s), in which like numerals indicate like elements, in which:

FIG. 6 illustrates a flowchart of an example method for data integrity verification in accordance with an example of the present disclosure.

DETAILED DESCRIPTION

Figure 1:
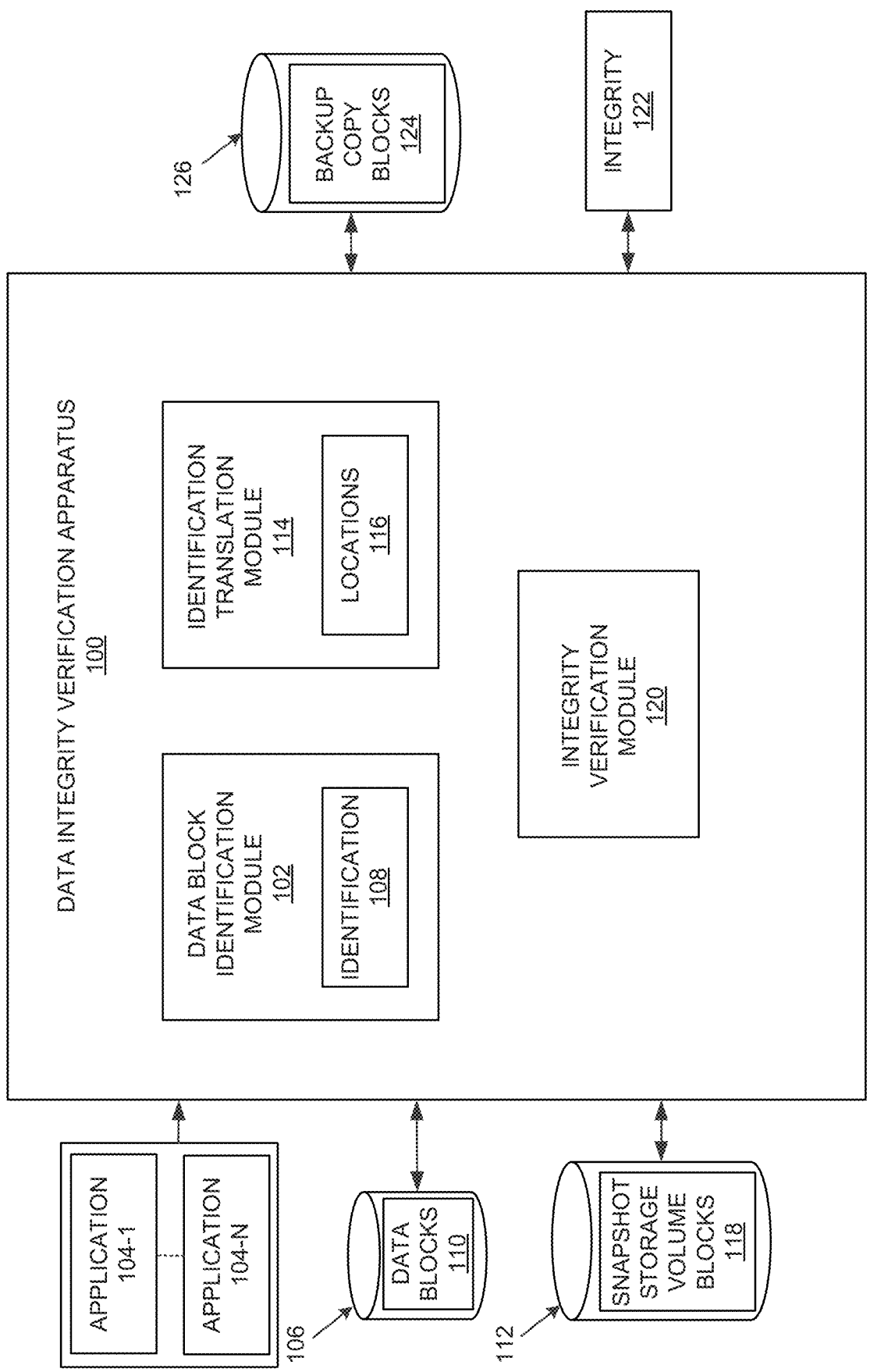
FIG. 1 illustrates a layout of a data integrity verification apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Data integrity verification apparatuses, methods for data integrity verification, and non-transitory computer readable media having stored thereon machine readable instructions to provide data integrity verification are disclosed herein. The apparatuses, methods, and non-transitory computer readable media disclosed herein provide for integrity verification based on snapshot storage volume blocks that are read from a snapshot storage volume by analyzing corresponding backup copy blocks stored in a backup copy for backup of a primary storage volume.

With respect to the primary storage volume, a client computing device, such as a host server or the like, may store data in a primary storage array, and may execute workloads against the data stored in the primary storage array. The primary storage volume may represent a collection of the data stored in the primary storage array. Data stored in the primary storage volume may be stored as blocks denoted data blocks.

With respect to the backup copy, the data stored in the primary storage array may be backed up in a backup appliance or in cloud (e.g., backup copy or cloud copies) separate from the client computing device and the primary storage array, for redundancy and data protection purposes, or the like. In some examples, the backup appliance may store data in a deduplicated form such that the data is stored more compactly than on the primary storage array. According to an example, a process of deduplication performed by a deduplication system on a collection of data (referred to herein as a "stream" of data or a "data stream") may include dividing the stream into fixed or variable length sections referred to herein as "chunks", identifying "duplicate" chunks having content identical to that of other chunks, storing one (full or compressed) copy of each chunk not identified as being a duplicate of an already-stored chunk and, for duplicate chunks, storing references (e.g., pointers) to the stored copy of the chunk without storing the same chunk again. In this manner, a deduplication process may often avoid storing duplicates of the same chunk in a deduplication store. In such examples, the deduplication system may store a deduplicated representation of a data stream, the deduplicated representation comprising selected data chunks and sufficient metadata to reconstruct the full version of a data stream from the selected data chunks and the metadata. Data stored in the backup copy may be stored as blocks denoted backup copy blocks.

With respect to the snapshot storage volume (or snapshot volume), a computing system, such as a storage system (e.g., a storage array), server, or the like, may take snapshot(s) of a volume, such as a virtual volume, the primary storage volume, or any other type of collection of data. Taking a snapshot of a volume may generate a snapshot storage volume (e.g., a snapshot virtual volume) that is a representation of the data contents of the volume as it existed at (or near) the point in time when the snapshot was created or "taken". A volume, such as the primary storage volume, from which a snapshot is taken may be referred to as a "base" volume (such as a base virtual volume).

A snapshot storage volume may represent a base volume via metadata and a collection of data (though the collection of data may initially be empty in some examples). For example, at the time the snapshot is taken, the snapshot storage volume may represent the same data that is presently contained in the base volume with metadata including a collection of pointers back to the data stored in the base volume. When changes are made to data of the base volume after the snapshot is taken (e.g., due to writes to the base volume), steps may be taken to preserve the data represented by the snapshot.

For example, when copy-on-write techniques are used, for each storage location of the base volume, the first write to the location after taking the snapshot may cause the data present at that location (prior to the write) to be copied out of the base volume and into storage space for the snapshot storage volume before overwriting the data present at that location in the base volume, in order to preserve the data represented by the snapshot. In other examples, when redirect-on-write techniques are used, after a snapshot is taken, writes to locations of the base volume are re-directed to another location such that data represented by the snapshot storage volume are preserved in the original locations in which that data existed in the base volume prior to the snapshot.

In some examples, taking multiple snapshots relative to a volume may form a "tree" (or "virtual volume tree" herein) including a base volume and one or more snapshot storage volume(s), wherein each of the snapshot storage volume(s) may descend directly from the base volume or indirectly from the base volume (e.g., by descending directly from another snapshot storage volume descending directly or indirectly from the base volume).

In some examples, it may be desirable to copy or migrate data from one storage system to another, for example, to balance data across a plurality of storage systems, to replace one storage system with another storage system (e.g., having capabilities not available on the storage system being replaced, etc.), or the like. It may be desirable to copy data to another storage system for backup or other data protection purposes, or the like.

As noted above, in some examples, a virtual volume may be a base virtual volume from which one or more snapshot virtual volumes descend directly or indirectly. There may be many beneficial uses for snapshot virtual volumes of a base virtual volume, such as, for example, for backup, replication, creating test and development (i.e., "test and dev") environments from production data, and the like.

With respect to the apparatuses, methods, and non-transitory computer readable media disclosed herein, in information security, data integrity may represent an integral aspect of data protection. One aspect of data protection may include the storage of multiple copies of data across different storage entities. In this regard, integrity verification of such multiple copies of data stored across different storage entities can be technically challenging due to the increasing amounts of data and limitations in time allotted for data protection. The multiple copies of data may be utilized, for example, for recovery purposes where periodic full backups may be scheduled along with frequent incremental backups. Moreover, depending on the user application and file system, an entire primary storage volume may be allocated and initialized, which may result in data verification for all of the blocks in the primary storage volume, even though actual user data stored may be a relatively smaller proportion of the overall primary storage volume capacity.

Examples described herein may address these issues by mounting a snapshot storage volume that represents a snapshot of data stored in the primary storage volume, and querying a user application for identification of actual data blocks for all the file entities (or selected entities) that are stored for the application in the snapshot storage volume. Using physical extent mappings and volume block addressing, the identified locations of the data blocks in the primary storage volume may be translated to locations of snapshot storage volume blocks of the snapshot storage volume. The snapshot storage volume blocks may be read from the snapshot storage volume. In this manner, integrity verification may be performed on the actual data blocks that are stored for the application in the snapshot storage volume. That is, integrity verification may be performed based on the snapshot storage volume blocks that are read from the snapshot storage volume by further analyzing corresponding backup copy blocks stored in a backup copy for backup of the primary storage volume.

In examples described herein, module(s), as described herein, may be any combination of hardware and programming to implement the functionalities of the respective module(s). In some examples described herein, the combinations of hardware and programming may be implemented in a number of different ways. For example, the programming for the modules may be processor executable instructions stored on a non-transitory machine-readable storage medium and the hardware for the modules may include at least one processing resource (e.g., at least one processor, CPU, circuitry, etc.) to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates a layout of an example data integrity verification apparatus (hereinafter also referred to as "apparatus 100").

Referring to FIG. 1, the apparatus 100 may include a data block identification module 102 to obtain, from an application 104 (of a plurality of applications 104-1 to 104-N) for which data is stored in a primary storage volume 106, an identification 108 of data blocks 110 of the primary storage volume 106 that are stored for the application 104 in a snapshot storage volume 112 that represents a snapshot of data stored in the primary storage volume 106. The identification 108 may include references to locations of the data blocks 110 in the primary storage volume 106.

According to examples disclosed herein, the data block identification module 102 may obtain, from the application 104 for which data is stored in the primary storage volume 106, the identification 108 of data blocks 110 that correspond to files associated with the application 104.

An identification translation module 114 may utilize physical extent mappings and volume block addressing to translate the identified locations of the data blocks 110 in the primary storage volume 106 to locations 116 of snapshot storage volume blocks 118 of the snapshot storage volume 112.

An integrity verification module 120 may verify, based on the snapshot storage volume blocks 118 that are read from the snapshot storage volume 112, integrity 122 of corresponding backup copy blocks 124 stored in a backup copy 126 for backup of the primary storage volume 106.

According to examples disclosed herein, the integrity verification module 120 may generate hashes of the snapshot storage volume blocks 118 that are read from the snapshot storage volume 112. The integrity verification module 120 may generate hashes of the corresponding backup copy blocks 124 stored in the backup copy 126. The integrity verification module 120 may determine, based on comparison of the hashes of the snapshot storage volume blocks 118 to corresponding hashes of the corresponding backup copy blocks 124, integrity 122 of the corresponding backup copy blocks 124 stored in the backup copy 126 for backup of the primary storage volume 106.

According to examples disclosed herein, the integrity verification module 120 may determine whether each hash of the snapshot storage volume blocks 118 matches each corresponding hash of the corresponding backup copy blocks 124. Based on a determination that each hash of the snapshot storage volume blocks 118 matches each corresponding hash of the corresponding backup copy blocks 124, the integrity verification module 120 may generate an indication of validity of the corresponding backup copy blocks 124 stored in the backup copy 126. Based on a determination that one of the hashes of the snapshot storage volume blocks 118 does not match one of the corresponding hashes of the corresponding backup copy blocks 124, the integrity verification module 120 may generate an indication of invalidity of the corresponding backup copy blocks 124 stored in the backup copy 126.

Operation of the apparatus 100 is described in further detail with reference to FIGS. 1-4.

Figure 2:
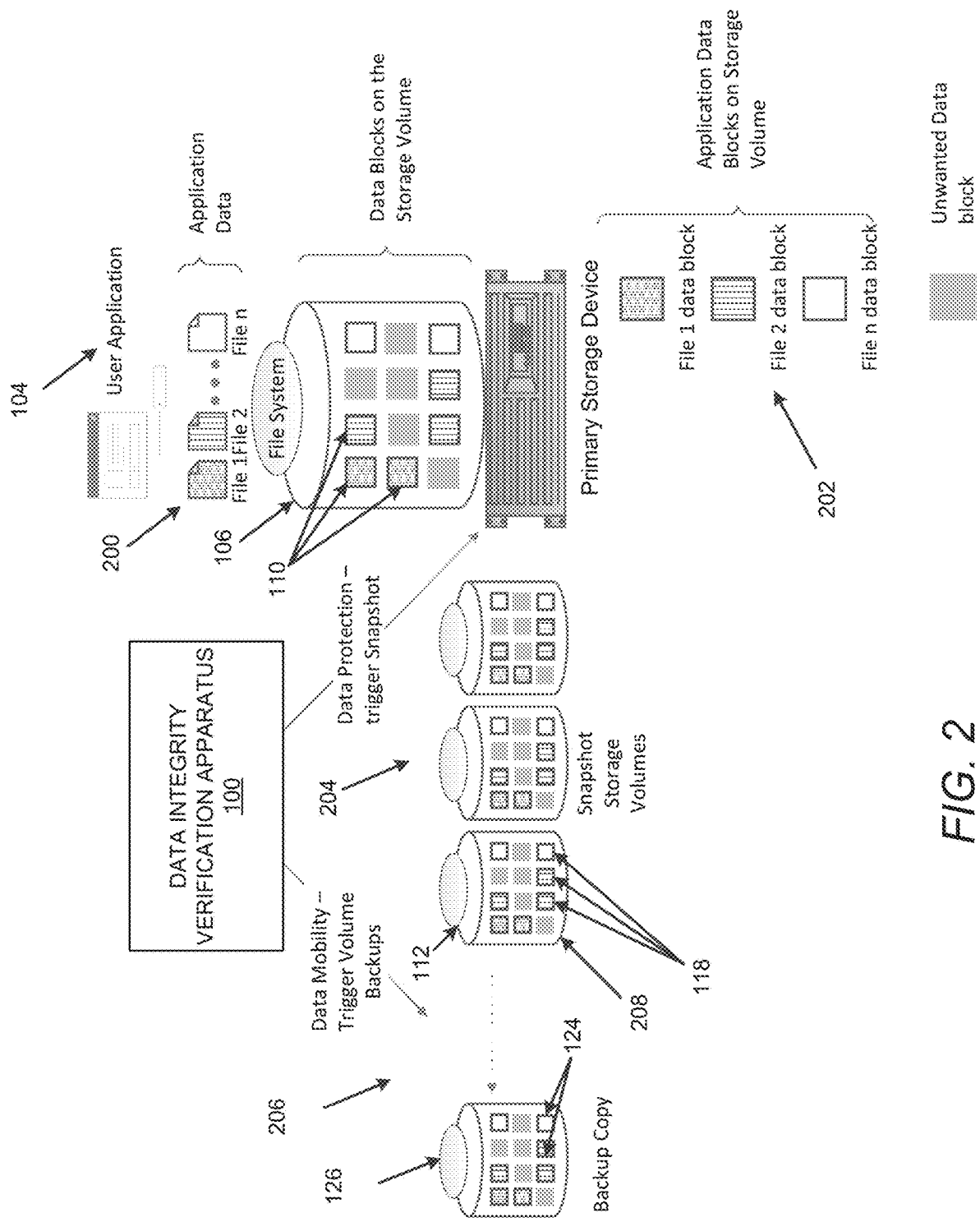
FIG. 2 illustrates further details of the layout of FIG. 1 to illustrate operation of the data integrity verification apparatus of FIG. 1 in accordance with an example of the present disclosure.

FIG. 2 illustrates further details of the layout of FIG. 1 to illustrate operation of the apparatus 100 in accordance with an example of the present disclosure.

Referring to FIGS. 1 and 2, and particularly FIG. 2, at 200, the data block identification module 102 may obtain, from the application 104 for which data is stored in a primary storage volume 106, an identification 108 of data blocks 110 of the primary storage volume 106 that are stored for the application 104 in a snapshot storage volume 112 that represents a snapshot of data stored in the primary storage volume 106. The identification 108 may include references to locations of the data blocks 110 in the primary storage volume 106. The data block identification module 102 may obtain, from the application 104 for which data is stored in the primary storage volume 106, the identification 108 of data blocks 110 that correspond to files (e.g., File 1, File 2, . . . , File n) associated with the application 104.

For the example of FIG. 2, the unwanted data blocks at 202 may represent data blocks that may be stored for other applications.

At 204, the identification translation module 114 may utilize physical extent mappings and volume block addressing to translate the identified locations of the data blocks 110 in the primary storage volume 106 to locations 116 of snapshot storage volume blocks 118 of the snapshot storage volume 112.

At 206, the integrity verification module 120 may verify, based on the snapshot storage volume blocks 118 that are read from the snapshot storage volume 112 (e.g., the most recent snapshot storage volume blocks at 208, or other intermediate snapshot storage volume blocks), integrity of corresponding backup copy blocks 124 stored in the backup copy 126 for backup of the primary storage volume 106.

Figure 3:
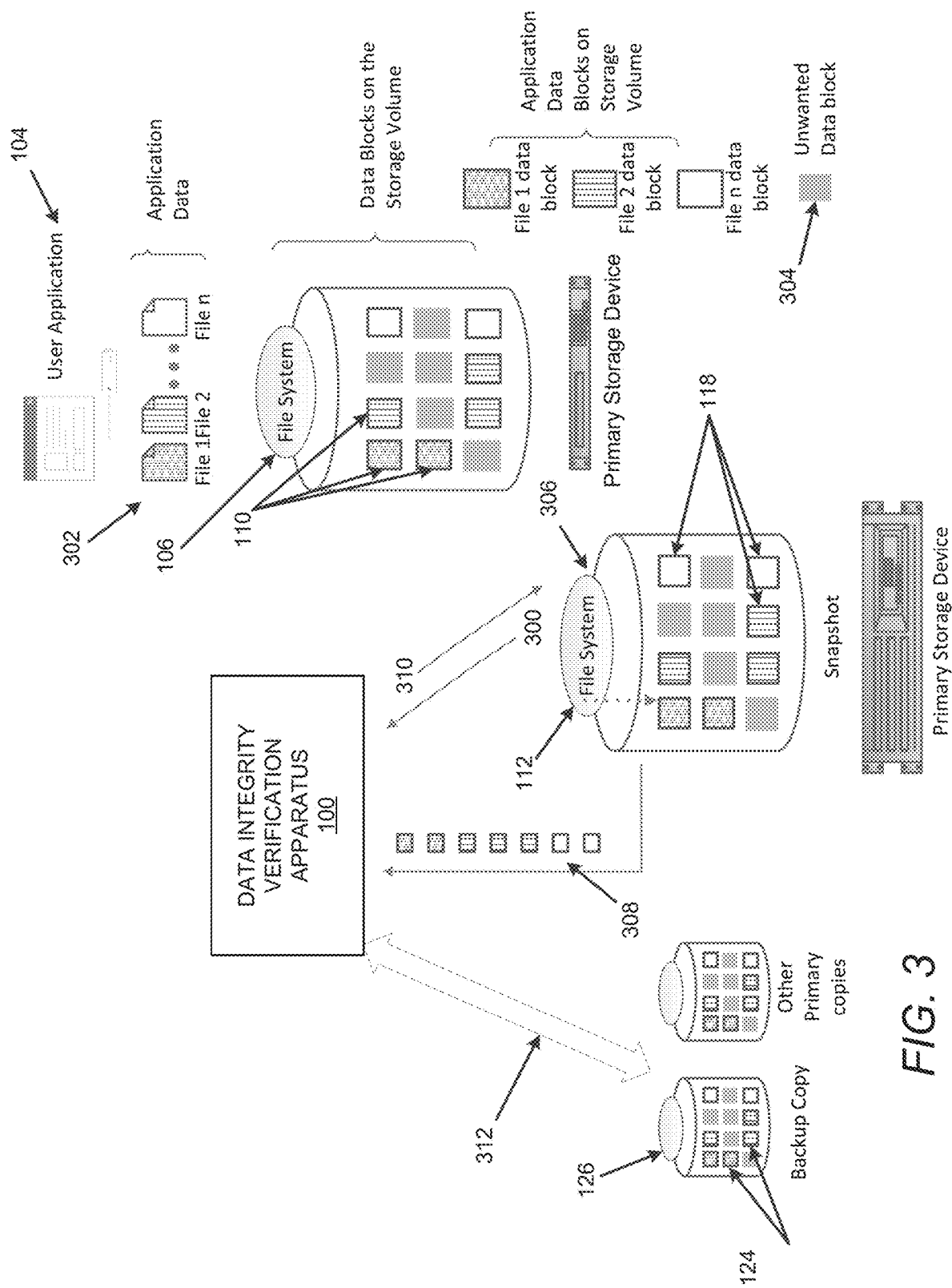
FIG. 3 illustrates a verification operation of the data integrity verification apparatus of FIG. 1 in accordance with an example of the present disclosure.

FIG. 3 illustrates a verification operation of the apparatus 100 in accordance with an example of the present disclosure.

Referring to FIGS. 1 and 3, and particularly FIG. 3, at 300, the snapshot storage volume 112 may be attached, and the application file system may be mounted with the apparatus 100.

At 302, the data block identification module 102 may obtain, from the application 104 for which data is stored in a primary storage volume 106, an identification 108 of data blocks 110 of the primary storage volume 106 that are stored for the application 104 in a snapshot storage volume 112 that represents a snapshot of data stored in the primary storage volume 106. The identification 108 may include references to locations of the data blocks 110 in the primary storage volume 106. The data block identification module 102 may obtain, from the application 104 for which data is stored in the primary storage volume 106, the identification 108 of data blocks 110 that correspond to files (e.g., File 1, File 2, . . . , File n) associated with the application 104.

For the example of FIG. 3, the unwanted data blocks at 304 may represent data blocks that may be stored for other applications.

At 306, the identification translation module 114 may utilize physical extent mappings and volume block addressing to translate the identified locations of the data blocks 110 in the primary storage volume 106 to locations 116 of snapshot storage volume blocks 118 of the snapshot storage volume 112. As shown in FIG. 3, the snapshot storage volume 112 may reside on a primary storage device. In this regard, the user application/data file-system may be queried for actual data blocks (e.g., the data blocks 110) for all the file entities (or selected entities) as part of a protection policy, and translated to physical volume blocks using the extent mappings and corresponding block addresses. Once translated, the physical volume blocks may then be read directly across different copies (e.g., snapshot/backup) of the primary storage volume. For example, FIEMAP ioctl( ) calls may be utilized to determine block locations for specific file entities in question.

For the example of FIG. 3, the snapshot storage volume blocks at 308 may represent all of the blocks that represent the application data which needs to be verified.

At 310, the application file system may be unmounted from the apparatus 100, and the snapshot storage volume 112 may be detached.

At 312, the integrity verification module 120 may verify, based on the snapshot storage volume blocks 118 that are read from the snapshot storage volume 112, integrity of corresponding backup copy blocks 124 stored in the backup copy 126 for backup of the primary storage volume 106. In this regard, the integrity verification module 120 may read the snapshot storage volume blocks 118 and perform verification as opposed to reading the entire snapshot storage volume 112.

With respect to an example of operation of the apparatus 100 for the verification operation of FIG. 3, the data block identification module 102 may obtain, from the application 104 for which data is stored in the primary storage volume 106, the identification 108 of data blocks 110 that correspond to files (e.g., File 1, File 2, and File 3) associated with the application 104. In this regard, extents may be considered as a contiguous set of data blocks.

The identification translation module 114 may utilize physical extent mappings and volume block addressing to translate the identified locations of the data blocks 110 in the primary storage volume 106 to locations 116 of snapshot storage volume blocks 118 of the snapshot storage volume 112. In this regard, in order to determine extent mappings for each application entity, by using FIEMAP ioctl( ) calls (e.g., implementations such as the 'filefrag' utility), the extents and corresponding logical and physical offsets may be determined in terms of blocks.

For example, extent mappings for File 1 may be specified as follows:

| File size of File 1 is 65536 (16 blocks, blocksize 4096) | | | | | |
|---|---|---|---|---|---|
| ext | logical-offset | physical-offset | expected | length-of-extent | flags |
| 0 | 0 | 4884224 | | 8 | |
| 1 | 16 | 4884240 | 4884232 | 8 | |

For the values 0, 0, 4884224, and 8 above, 0 represents the first extent, 0 represents the logical offset, 4884224 represents the physical-offset, and 8 represents the length of the extent (in terms of number of blocks). Similarly, for the values (on the next line) 1, 16, 4884240, 4884232 and 8, 1 represents the second extent, 16 represents the logical-offset, 4884240 represents the actual physical-offset of the extent, while 4884232 represents the expected physical-offset of the extent, and 8 represents the length of the extent (in terms of number of blocks).

File 1: 2 Extents Found

Extent mappings for File 2 may be specified as follows:

| File size of File 2 is 8259 (3 blocks, blocksize 4096) | | | | | |
|---|---|---|---|---|---|
| ext | logical-offset | physical-offset | expected | length-of-extent | flags |
| 0 | 0 | 19990717 | | 3 | eof |

File 2: 1 Extent Found
Extent mappings for File 3 may be specified as follows:

File size of File 3 is 35814258 (8744 blocks, blocksize 4096)

| ext | logical-offset | physical-offset | expected | length-of-extent | flags |
|---|---|---|---|---|---|
| 0 | 0 | 4892672 | | 8192 | |
| 1 | 8192 | 4950096 | 4900864 | 552 | eof |

File 3: 2 Extents Found

Next, the physical volume partition layout may be determined (e.g., using block device ioctls( ) such as HDIO_GETGEO, BLKGETSIZE or implementations such as fdisk, parted, etc.). For example, the physical volume partition layout may be specified as follows:

```
Disk /dev/sda: 107.4 GB, 107374182400 bytes
255 heads, 63 sectors/track, 13054 cylinders, total 209715200 sectors
Units = sectors of 1 * 512 = 512 bytes
Sector size (logical/physical): 512 bytes / 512 bytes
I/O size (minimum/optimal): 512 bytes / 512 bytes
Disk identifier: 0x0006094c
Device Boot    Start      End    Blocks  Id System
/dev/sda1  *    2048   1026047  512000   83 Linux
Partition 1 does not end on cylinder boundary.
/dev/sda2     1026048 209715199 104344576 83 Linux
The application files reside on partition 2 (/dev/sda2) on physical volume.
```

Next, by using the extent physical offset and volume block addressing, the data blocks (e.g., for the first extent of File 1) may be read directly from the snapshot storage volume or the backup copy.

The integrity verification module 120 may verify, based on the snapshot storage volume blocks 118 that are read from the snapshot storage volume 112, integrity of corresponding backup copy blocks 124 stored in the backup copy 126 for backup of the primary storage volume 106. In this regard, a hash (or a checksum) may be determined as follows:

```
dd if=/dev/sda bs=4096 skip=$(( ((1026048 * 512)/4096) +
((4884224)) ))
count=8 | md5sum
   8+0 records in
   8+0 records out
   32768 bytes (33 kB) copied, 0.000173176 s, 189 MB/s
   580957bc998e59ca8dd3fbc02ef3c26d -
   Calculation Numbers Used:
   /dev/sda = the Physical volume represented in the system
   1026048 = Start Physical partition sector offset for /dev/sda2 partition
where File 1 resides (Sector Size in 512 bytes)
     512/4096 = sector offset adjusted for 4096 bytes instead of 512 bytes.
     4884224 = File 1's first physical extent block offset.
     8 = Length of File 1's first extent (number of data blocks part of the
       extent.
blocksize = 4096)
   MD5SUM for first extent for File 1 (first 8 data blocks) =
580957bc998e59ca8dd3fbc02ef3c26d
```

The aforementioned steps may be repeated, and the hash (or the checksum) may be determined for all the extents of File 1 and other files (e.g., File 2 and File 3). These steps may be repeated by directly accessing the data blocks using the already calculated block addresses (e.g., as discussed above) on the backup copy, and the hash (or the checksum) may be determined to verify the hashes.

Figure 4:
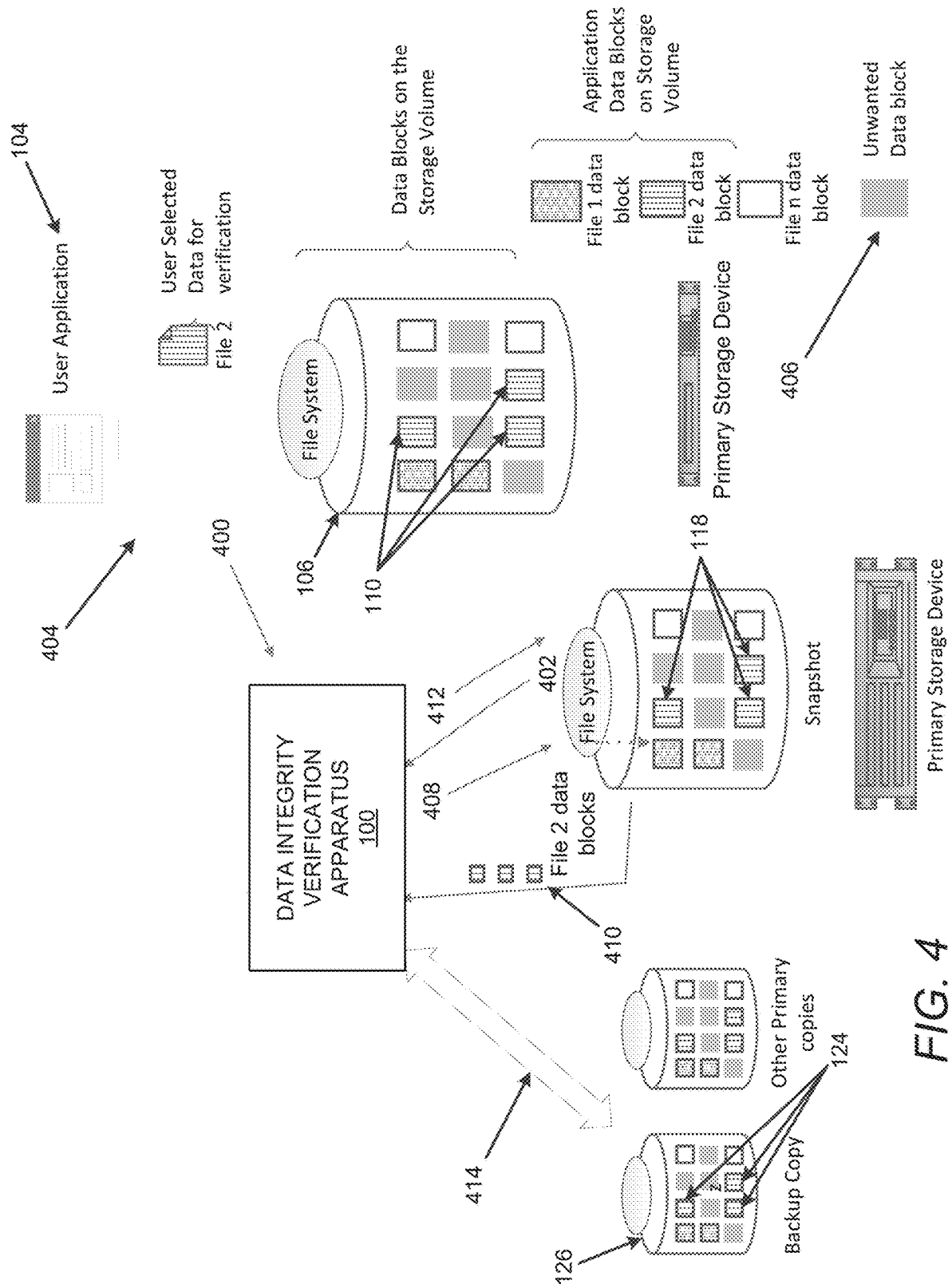
FIG. 4 illustrates another verification operation of the data integrity verification apparatus of FIG. 1 in accordance with an example of the present disclosure.

FIG. 4 illustrates another verification operation of the apparatus 100 in accordance with an example of the present disclosure.

Referring to FIGS. 1 and 4, and particularly FIG. 4, at 400, a determination may be made as to the data files that are to be verified. In this regard, a user may request data verification for individual application entities against the entire application content.

At 402, the snapshot storage volume 112 may be attached, and the application file system may be mounted with the apparatus 100.

At 404, the data block identification module 102 may obtain, from the application 104 for which data is stored in a primary storage volume 106, an identification 108 of specified data blocks 110 (e.g., user selected file entities or otherwise selected entities) of the primary storage volume 106 that are stored for the application 104 in a snapshot storage volume 112 that represents a snapshot of data stored in the primary storage volume 106. The identification 108 may include references to locations of the specified data blocks 110 in the primary storage volume 106. The data block identification module 102 may obtain, from the application 104 for which data is stored in the primary storage volume 106, the identification 108 of specified data blocks 110 that correspond to files (e.g., File 2) associated with the application 104.

For the example of FIG. 4, the unwanted data blocks at 406 may represent data blocks that may be stored for other applications.

At 408, the identification translation module 114 may utilize physical extent mappings and volume block addressing to translate the identified locations of the data blocks 110 in the primary storage volume 106 to locations 116 of snapshot storage volume blocks 118 of the snapshot storage volume 112. In this regard, the user application/data filesystem may be queried for specified data blocks (e.g., the data blocks 110) for user selected file entities (or otherwise specified entities) as part of a protection policy, and translated to physical volume blocks using the extent mappings and corresponding block addresses. Once translated, the physical volume blocks may then be read directly across different copies (e.g., snapshot/backup) of the primary storage volume. For example, FIEMAP ioctl( ) calls may be utilized to determine block locations for specific file entities in question.

For the example of FIG. 4, the snapshot storage volume blocks at 410 may represent the specified blocks that are stored in the backup copy 126 and that are to be analyzed for integrity.

At 412, the application file system may be unmounted from the apparatus 100, and the snapshot storage volume 112 may be detached.

At 414, the integrity verification module 120 may verify, based on the snapshot storage volume blocks 118 (e.g., specified snapshot storage volume blocks 118) that are read from the snapshot storage volume 112, integrity of the corresponding backup copy blocks 124 (e.g., specified corresponding backup copy blocks 124) stored in the backup copy 126 for backup of the primary storage volume 106. In this regard, the integrity verification module 120 may read the snapshot storage volume blocks 118 (e.g., specified snapshot storage volume blocks 118) and perform verification as opposed to reading the entire snapshot storage volume 112.

Figure 5:
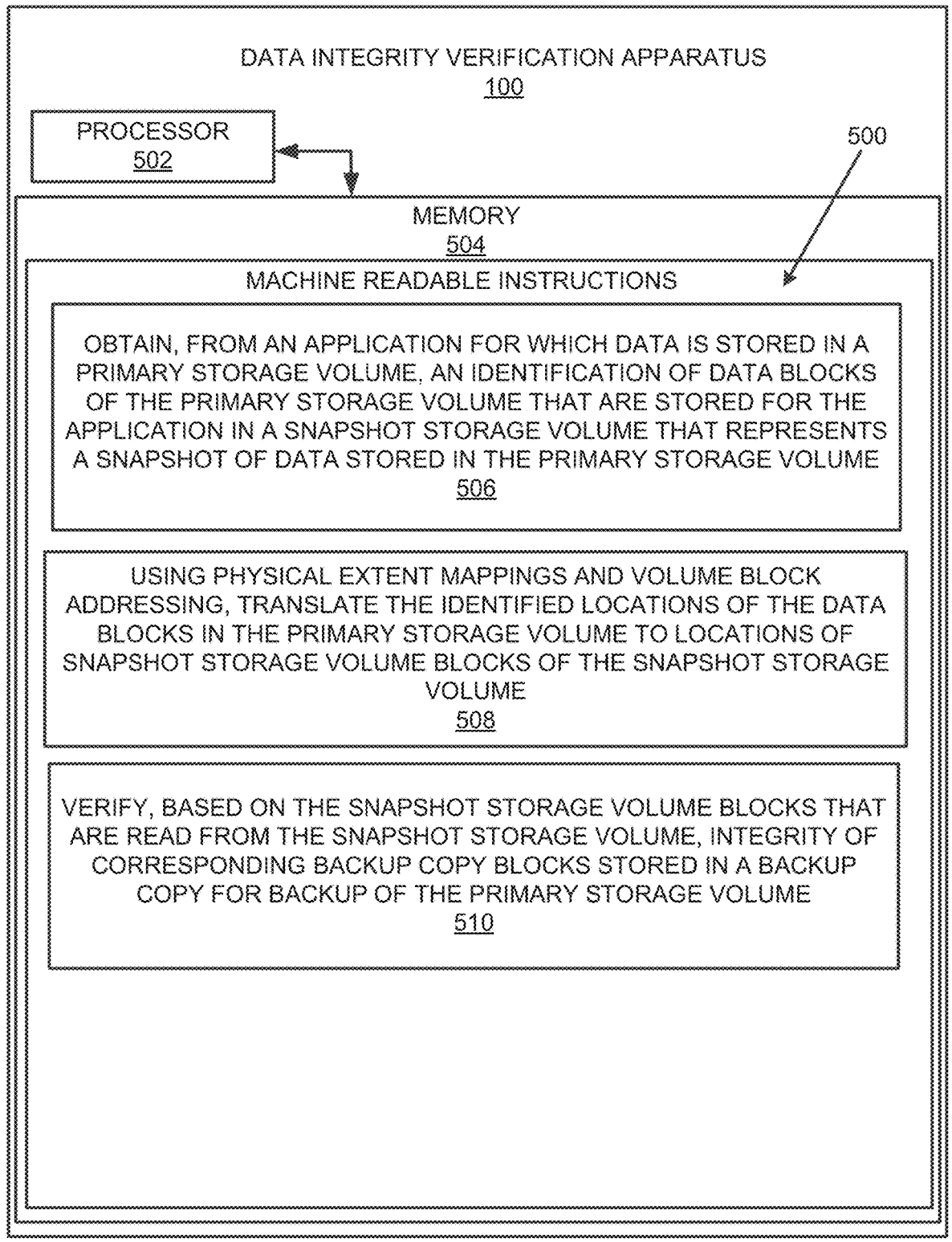
FIG. 5 illustrates an example block diagram for data integrity verification in accordance with an example of the present disclosure.
Figure 7:
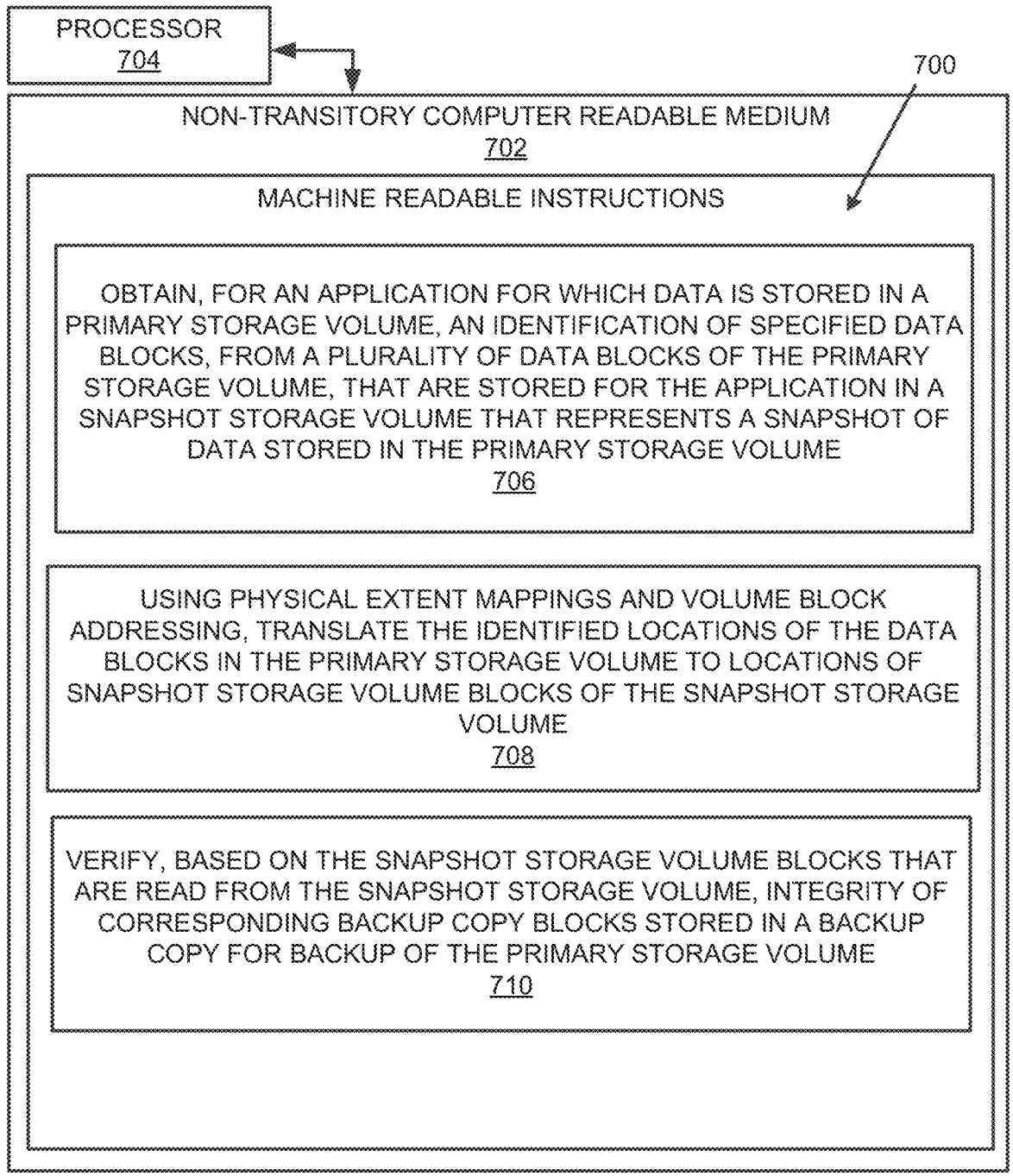
FIG. 7 illustrates a further example block diagram for data integrity verification in accordance with another example of the present disclosure.

FIGS. 5-7 respectively illustrate an example block diagram 500, a flowchart of an example method 600, and a further example block diagram 700 for data integrity verification, according to examples. The block diagram 500, the method 600, and the block diagram 700 may be implemented on the apparatus 100 described above with reference to FIG. 1 by way of example and not of limitation. The block diagram 500, the method 600, and the block diagram 700 may be practiced in other apparatus. In addition to showing the block diagram 500, FIG. 5 shows hardware of the apparatus 100 that may execute the instructions of the block diagram 500. The hardware may include a processor 502, and a memory 504 storing machine readable instructions that when executed by the processor cause the processor to perform the instructions of the block diagram 500. The memory 504 may represent a non-transitory computer readable medium. FIG. 6 may represent an example method for data integrity verification, and the steps of the method. FIG. 7 may represent a non-transitory computer readable medium 702 having stored thereon machine readable instructions to provide data integrity verification according to an example. The machine readable instructions, when executed, cause a processor 704 to perform the instructions of the block diagram 700 also shown in FIG. 7.

The processor 502 of FIG. 5 and/or the processor 704 of FIG. 7 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 702 of FIG. 7), such as hardware storage devices (e.g., RAM (random access memory), ROM (read only memory), EPROM (erasable, programmable ROM), EEPROM (electrically erasable, programmable ROM), hard drives, and flash memory). The memory 504 may include a RAM, where the machine readable instructions and data for a processor may reside during runtime.

Referring to FIGS. 1-5, and particularly to the block diagram 500 shown in FIG. 5, the memory 504 may include instructions 506 to obtain, from an application 104 (of a plurality of applications 104-1 to 104-N) for which data is stored in a primary storage volume 106, an identification 108 of data blocks 110 of the primary storage volume 106 that are stored for the application 104 in a snapshot storage volume 112 that represents a snapshot of data stored in the primary storage volume 106. The identification 108 may include references to locations of the data blocks 110 in the primary storage volume 106.

The processor 502 may fetch, decode, and execute the instructions 508 to use physical extent mappings and volume block addressing to translate the identified locations of the data blocks 110 in the primary storage volume 106 to locations 116 of snapshot storage volume blocks 118 of the snapshot storage volume 112.

The processor 502 may fetch, decode, and execute the instructions 510 to verify, based on the snapshot storage volume blocks 118 that are read from the snapshot storage volume 112, integrity of corresponding backup copy blocks 124 stored in a backup copy 126 for backup of the primary storage volume 106.

Referring to FIGS. 1-4 and 6, and particularly FIG. 6, for the method 600, at block 602, the method may include obtaining, from an application 104 (of a plurality of applications 104-1 to 104-N) for which data is stored in a primary storage volume 106, an identification 108 of data blocks 110 of the primary storage volume 106 that are stored for the application 104 in a snapshot storage volume 112 that represents a snapshot of data stored in the primary storage volume 106. The identification 108 may include references to locations of the data blocks 110 in the primary storage volume 106.

At block 604, the method may include using physical extent mappings and volume block addressing to translate the identified locations of the data blocks 110 in the primary storage volume 106 to locations 116 of snapshot storage volume blocks 118 of the snapshot storage volume 112.

At block 606, the method may include reading, from the snapshot storage volume, the snapshot storage volume blocks.

At block 608, the method may include verifying, based on the snapshot storage volume blocks 118 that are read from the snapshot storage volume 112, integrity of the corresponding backup copy blocks 124 stored in a backup copy 126 for backup of the primary storage volume 106.

Referring to FIGS. 1-4 and 7, and particularly FIG. 7, for the block diagram 700, the non-transitory computer readable medium 702 may include instructions 706 to obtain, from an application 104 (of a plurality of applications 104-1 to 104-N) for which data is stored in a primary storage volume 106, an identification 108 of specified data blocks 110 of the primary storage volume 106 that are stored for the application 104 in a snapshot storage volume 112 that represents a snapshot of data stored in the primary storage volume 106. The identification 108 may include references to locations of the specified data blocks 110 in the primary storage volume 106.

The processor 704 may fetch, decode, and execute the instructions 708 to use physical extent mappings and volume block addressing to translate the identified locations of the data blocks 110 in the primary storage volume 106 to locations 116 of snapshot storage volume blocks 118 of the snapshot storage volume 112.

The processor 704 may fetch, decode, and execute the instructions 710 to verify, based on the snapshot storage volume blocks 118 that are read from the snapshot storage volume 112, integrity of corresponding backup copy blocks 124 stored in a backup copy 126 for backup of the primary storage volume 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
   at least one processor; and
   a non-transitory computer readable medium storing machine readable instructions that when executed by the at least one processor cause the at least one processor to:
   obtain, from an application for which data is stored in a primary storage volume, an identification of data blocks of the primary storage volume that are stored for the application in a snapshot storage volume that represents a snapshot of data stored in the primary storage volume, wherein the identification includes references to locations of the data blocks in the primary storage volume, and the identification does not include data blocks stored for other applications;
   using physical extent mappings and volume block addressing, translate the locations, referenced in the identification, of the data blocks in the primary storage volume to locations of snapshot storage volume blocks of the snapshot storage volume; and verify, based on the snapshot storage volume blocks read from the snapshot storage volume, integrity of corresponding backup copy blocks corresponding to the snapshot storage volume blocks, wherein the corresponding backup copy blocks are stored, separate from the data blocks in the primary storage volume and separate from the snapshot storage volume blocks, in a backup copy for backup of the primary storage volume.

2. The apparatus according to claim 1, wherein the instructions to obtain, from the application for which data is stored in the primary storage volume, the identification of data blocks of the primary storage volume that are stored for the application in the snapshot storage volume that represents the snapshot of data stored in the primary storage volume are further to cause the processor to:

obtain, from the application for which data is stored in the primary storage volume, the identification of data blocks that correspond to files associated with the application.

3. The apparatus according to claim 1, wherein the instructions to verify, based on the snapshot storage volume blocks read from the snapshot storage volume, integrity of the corresponding backup copy blocks stored in the backup copy for backup of the primary storage volume are further to cause the processor to:

generate hashes of the snapshot storage volume blocks read from the snapshot storage volume;

generate hashes of the corresponding backup copy blocks stored in the backup copy; and determine, based on comparison of the hashes of the snapshot storage volume blocks to corresponding hashes of the corresponding backup copy blocks, integrity of the corresponding backup copy blocks stored in the backup copy for backup of the primary storage volume.

4. The apparatus according to claim 3, wherein the instructions to determine, based on comparison of the hashes of the snapshot storage volume blocks to corresponding hashes of the corresponding backup copy blocks, integrity of the corresponding backup copy blocks stored in the backup copy for backup of the primary storage volume are further to cause the processor to:

determine whether each hash of the snapshot storage volume blocks matches each corresponding hash of the corresponding backup copy blocks;

based on a determination that each hash of the snapshot storage volume blocks matches each corresponding hash of the corresponding backup copy blocks, generate an indication of validity of the corresponding backup copy blocks stored in the backup copy; and based on a determination that one of the hashes of the snapshot storage volume blocks does not match one of the corresponding hashes of the corresponding backup copy blocks, generate an indication of invalidity of the corresponding backup copy blocks stored in the backup copy.

5. The apparatus according to claim 1, wherein the snapshot storage volume includes data blocks of the primary storage volume that are stored for a plurality of applications including the application.

6. The apparatus of claim 1, wherein the instructions to cause the at least one processor to verify integrity of backup copy blocks are performed by the at least one processor without reading the entire snapshot storage volume.

7. A computer implemented method comprising:

obtaining, for an application for which data is stored in a primary storage volume, an identification of data blocks of the primary storage volume that are stored for the application in a snapshot storage volume that represents a snapshot of data stored in the primary storage volume, wherein the identification includes references to locations of the data blocks in the primary storage volume, and the identification does not include data blocks stored for other applications;

using physical extent mappings and volume block addressing, translating the locations, referenced in the identification, of the data blocks in the primary storage volume to locations of snapshot storage volume blocks of the snapshot storage volume;

reading, from the snapshot storage volume, the snapshot storage volume blocks; and verifying, based on the snapshot storage volume blocks read from the snapshot storage volume, integrity of corresponding backup copy blocks corresponding to the snapshot storage volume blocks, wherein the corresponding backup copy blocks are stored, separate from the data blocks in the primary storage volume and separate from the snapshot storage volume blocks, in a backup copy for backup of the primary storage volume.

8. The method according to claim 7, wherein obtaining, for the application for which data is stored in the primary storage volume, the identification of data blocks of the primary storage volume that are stored for the application in the snapshot storage volume that represents the snapshot of data stored in the primary storage volume, further comprises:

obtaining, from the application for which data is stored in the primary storage volume, the identification of the data blocks that correspond to files associated with the application.

9. The method of claim 8, wherein the files are user selected.

10. The method according to claim 7, wherein verifying, based on the snapshot storage volume blocks read from the snapshot storage volume, integrity of the corresponding backup copy blocks stored in the backup copy for backup of the primary storage volume further comprises:

generating hashes of the snapshot storage volume blocks read from the snapshot storage volume;

generating hashes of the corresponding backup copy blocks stored in the backup copy; and determining, based on comparison of the hashes of the snapshot storage volume blocks to corresponding hashes of the corresponding backup copy blocks, integrity of the corresponding backup copy blocks stored in the backup copy for backup of the primary storage volume.

11. The method according to claim 10, wherein determining, based on comparison of the hashes of the snapshot storage volume blocks to corresponding hashes of the corresponding backup copy blocks, integrity of the corresponding backup copy blocks stored in the backup copy for backup of the primary storage volume further comprises:

determining whether each hash of the snapshot storage volume blocks matches each corresponding hash of the corresponding backup copy blocks;

based on a determination that each hash of the snapshot storage volume blocks matches each corresponding hash of the corresponding backup copy blocks, generating an indication of validity of the corresponding backup copy blocks stored in the backup copy; and based on a determination that one of the hashes of the snapshot storage volume blocks does not match one of the corresponding hashes of the corresponding backup copy blocks, generating an indication of invalidity of the corresponding backup copy blocks stored in the backup copy.

12. The method according to claim 7, wherein the snapshot storage volume includes data blocks of the primary storage volume that are stored for a plurality of applications including the application.

13. The method of claim 7, wherein the verifying integrity of backup copy blocks is performed without reading the entire snapshot storage volume.

14. A non-transitory computer readable medium having stored thereon machine readable instructions, the machine readable instructions, when executed, cause a processor to:
   obtain, for an application for which data is stored in a primary storage volume, an identification of specified data blocks, from a plurality of data blocks of the primary storage volume, that are stored for the application in a snapshot storage volume that represents a snapshot of data stored in the primary storage volume, wherein the identification includes references to locations of the specified data blocks in the primary storage volume, and the identification does not include data blocks stored for other applications;
   using physical extent mappings and volume block addressing, translate the locations, referenced in the identification, of the specified data blocks in the primary storage volume to locations of snapshot storage volume blocks of the snapshot storage volume; and
   verify, based on the snapshot storage volume blocks read from the snapshot storage volume, integrity of corresponding backup copy blocks corresponding to the snapshot storage volume blocks, wherein the corresponding backup copy blocks are stored, separate from the data blocks in the primary storage volume and separate from the snapshot storage volume blocks, in a backup copy for backup of the primary storage volume.

15. The non-transitory computer readable medium according to claim 14, wherein the machine readable instructions to obtain, for the application for which data is stored in the primary storage volume, the identification of specified data blocks, from the plurality of data blocks of the primary storage volume, that are stored for the application in the snapshot storage volume that represents the snapshot of data stored in the primary storage volume, when executed, further cause the processor to:
   obtain, for the application for which data is stored in the primary storage volume, the identification of the specified data blocks that correspond to files associated with the application.

16. The non-transitory computer readable medium of claim 15, wherein the files are user selected.

17. The non-transitory computer readable medium according to claim 14, wherein the machine readable instructions to verify, based on the snapshot storage volume blocks read from the snapshot storage volume, integrity of the corresponding backup copy blocks stored in the backup copy for backup of the primary storage volume, when executed, further cause the processor to:
   generate hashes of the snapshot storage volume blocks read from the snapshot storage volume;
   generate hashes of the corresponding backup copy blocks stored in the backup copy; and
   determine, based on comparison of the hashes of the snapshot storage volume blocks to corresponding hashes of the corresponding backup copy blocks, integrity of the corresponding backup copy blocks stored in the backup copy for backup of the primary storage volume.

18. The non-transitory computer readable medium according to claim 17, wherein the machine readable instructions to determine, based on comparison of the hashes of the snapshot storage volume blocks to corresponding hashes of the corresponding backup copy blocks, integrity of the corresponding backup copy blocks stored in the backup copy for backup of the primary storage volume, when executed, further cause the processor to:
   determine whether each hash of the snapshot storage volume blocks matches each corresponding hash of the corresponding backup copy blocks;
   based on a determination that each hash of the snapshot storage volume blocks matches each corresponding hash of the corresponding backup copy blocks, generate an indication of validity of the corresponding backup copy blocks stored in the backup copy; and
   based on a determination that one of the hashes of the snapshot storage volume blocks does not match one of the corresponding hashes of the corresponding backup copy blocks, generate an indication of invalidity of the corresponding backup copy blocks stored in the backup copy.

19. The non-transitory computer readable medium according to claim 14, wherein the snapshot storage volume includes data blocks of the primary storage volume that are stored for a plurality of applications including the application.

20. The non-transitory computer readable medium according to claim 14, wherein the instructions to verify integrity of backup copy blocks is performed without reading the entire snapshot storage volume.

* * * * *